United States Patent [19]
Watari

[11] Patent Number: 4,837,828
[45] Date of Patent: Jun. 6, 1989

[54] PATTERN FEATURE EXTRACTING SYSTEM
[75] Inventor: Masao Watari, Tokyo, Japan
[73] Assignee: NEC Corporation, Tokyo, Japan
[21] Appl. No.: 61,009
[22] Filed: Jun. 11, 1987

Related U.S. Application Data
[63] Continuation of Ser. No. 493,200, May 10, 1983, abandoned.

[30] Foreign Application Priority Data

May 12, 1982 [JP] Japan .................................. 57-79379

[51] Int. Cl.$^4$ ................................................ G10L 5/00
[52] U.S. Cl. .......................................... 381/36; 381/43
[58] Field of Search ............... 381/42, 43, 36; 382/34, 382/36, 43

[56] References Cited

U.S. PATENT DOCUMENTS

| | | | |
|---|---|---|---|
| 4,032,711 | 6/1977 | Sambur | 381/42 |
| 4,184,049 | 1/1980 | Crochiere et al. | 381/41 |
| 4,520,500 | 5/1985 | Mizumo et al. | 381/43 |

OTHER PUBLICATIONS

Flanagan, Speech Analysis Synthesis and Perception, Springer 1972, pp. 361–363.
Bogner, R., "On Talker Verification via Orthogonal Parameters", IEEE Trans. on ASSP, vol. ASSP-29, No. 1, (2/81), pp. 1–12.
Fukunaga, K. and Koontz, W., "Application of the Karhumen–Loeve Expansion to Feature Selection and Ordering"; IEEE Trans. on Computer, vol. C-19, No. 4, (4/70), pp. 311–318.
Ohga, H. "A Walsh–Hadamard Transform LSI for Speech Recognition", IEEE Trans. on Consumer Electronics, vol. CE-28, No. 3, (8/82), pp. 263–270.
Jayant, N. S. and Noll, P., Digital Coding of Waveforms, Bell Telephone Laboratories, Inc., 1984, p. 519.
"A System of Spoken Word Recognition by Nonlinear Spectral Matching", Oct., 1979, pp. 59–67, Japan.

Primary Examiner—Emanuel S. Kemeny
Attorney, Agent, or Firm—Sughrue, Mion, Zinn, Macpeak & Seas

[57] ABSTRACT

In a speech signal processing system for transmission or recognition, cepstrum data is normalized by subtraction from its straight-line approximation. As a result, personal and transmission characteristics are eliminated, and both data and subtraction computations are reduced.

10 Claims, 3 Drawing Sheets

PATTERN FEATURE EXTRACTING SYSTEM

This is a continuation, of application Ser. No. 493,200, filed May 10, 1983, now abandoned.

FIELD OF THE INVENTION

The present invention relates to a system for extracting feature parameters in a pattern to be recognized, and more particularly to a system for normalizing the feature parameters attained by orthogonal transformations. The memory capacity and number of calculations ordinarily required is reduced.

DESCRIPTION OF THE PRIOR ART

There is well known in the art of pattern recognition a technique in which the parameters attained by measurements or analyses are orthogonally transformed so as to compress the quantity of information and the number of the calculations required. In speech recognition, for example, cepstrum data is used as the feature parameters. The data is prepared by logarithmically transforming spectral data obtained by frequency analysis of a speech signal, and then inversely Fourier-transforming (as a kind of orthogonal transformation) the logarithmically transformed data.

It is important to extract normalized data which is not influenced by a variety of external factors. In speech recognition, for example, there has been proposed as a normalizing method for extracting the speech features independent of personal characteristics or transmission characteristics a method in which a least-squares straight line fit for a speech spectrum is determined and is subtracted from the original speech spectrum. This method is disclosed in PGPRL 79-46 of The Institute of Electronics and Communication Engineers of Japan, entitled "A System of Spoken Word Recognition by Non-linear Spectral Matching", published in October, 1979.

The personal characteristics of speech vary with vocal tract length or radiation characteristics, whereas transmission characteristics vary with the telephone or other transmission line used. These characteristics can be modelled by a straight line $(a \cdot i + b)$. By determining the least-squares straight line represented by $(a \cdot i + b)$ and by subtracting the respective values given by the least-squares straight line from the corresponding value of the original speech spectrum, it is possible to obtain a normalized spectrum from which distortions due to personal and/or transmission characteristics are eliminated. More specifically, if the i-th spectrum is designated by $f_i$, and the least-squares straight line is expressed by $(a \cdot i + b)$, the normalized spectrum $g_i$ is given by the following equation:

$$g_i = f_i - (a \cdot i + b) \tag{1}$$

wherein $i = 1, \ldots, n$.

The least-squares straight line is determined by obtaining the coefficients a and b that minimize an error E expressed by $$E = \sum_{i=1}^{n} \{f_i - (a \cdot i + b)\}^2. \tag{2}$$

Specifically, the coefficients a and b are obtained by the following equations:

$$\frac{\partial E}{\partial a} = 0; \tag{3}$$

and $$\frac{\partial E}{\partial b} = 0. \tag{4}$$

In more detail, the coefficients a and b are calculated by using equations (5) and (6):

$$a = \frac{n \sum_{i=1}^{n} i \cdot f_i - \sum_{i=1}^{n} i \cdot \sum_{i=1}^{n} f_i}{n \sum_{i=1}^{n} i^2 - \left(\sum_{i=1}^{n} i\right)^2} \tag{5}$$

and $$b = \frac{\sum_{i=1}^{n} i^2 \cdot \sum_{i=1}^{n} f_i - \sum_{i=1}^{n} i \cdot \sum_{i=1}^{n} i \cdot f_i}{n \sum_{i=1}^{n} i^2 - \left(\sum_{i=1}^{n} i\right)^2}. \tag{6}$$

By making use of the coefficients a and b thus determined, the least-squares straight line $(a \cdot i + b)$ is obtained, and the normalization is conducted by substrating the obtained least-squares straight line thus obtained from the original speech spectrum $f_i$ in accordance with equation (1).

The orthogonal transformation used in the pattern recognition includes the Fourier transform, the Walsh-Hadamard transform, and the KL (Karhunen-Loéve) transform, all of which are used frequently especially in the field of speech recognition. The Fourier transform (or inverse Fourier transform) is widely used for extracting cepstrum data, as described above, whereas the two others are also used in feature extracting methods for speech recognition. For example, reference should be made to the paper "A WALSH-HADAMARD TRANSFORM LSI FOR SPEECH RECOGNITION" by Hidefumi Ohga et al., IEEE TRANSACTIONS ON CONSUMER ELECTRONICS, Vol, CE-28, No. 3, August 1982, pp. 263 to 270, the paper "APPLICATION OF THE KARHUNEN-LOÉVE EXPANSION TO FEATURE SELECTION AND ORDERING" by Keinosuke Fukunaga and Warren L. G. Koontz, IEEE TRANSACTIONS ON COMPUTERS, VOL. C-19, NO. 4, April 1970, pp. 311 to 318, and the paper "ON TALKER VERIFICATION VIA ORTHOGONAL PARAMETERS" by Robert E. Bogener, IEEE TRANSACTIONS ON ACOUSTICS, SPEECH, AND SIGNAL PROCESSING, VOL. ASSP-29, NO. 1, February 1981, pp. 1 to 12.

As has been described above, normalization in the prior art is effected by an orthogonal transformation after subtracting the parameters given by at least-squares straight line from the corresponding parameters for the input pattern. The calculations for this normalization according to equation (1) require n subtractions, even if the least-squares straight line $(a \cdot i + b)$ has been tabulated in advance. Therefore the prior art normalization is not preferable in a pattern recognition system which requires a reduction in the number of calculations and a simplification of the circuitry.

SUMMARY OF THE INVENTION

It is, therefore, an object of the present invention to provide a pattern feature extracting system which can significantly reduce the number of subtractions in normalizing the feature parameters obtained by orthogonal transformations.

Another object of the present invention is to provide a pattern feature extracting system for obtaining the normalized feature parameters used for speech recognition, which can significantly reduce the memory capacity required and the number of calculations.

According to the present invention, a pattern feature extracting system comprises a first orthogonal transformation means for orthogonally transforming pattern data, which is composed of n pieces of pattern information, in order to develop m (where m < n) first orthogonal parameters; means for determining a least-squares straight line for the n pieces of information; a calculation means for calculating m orthogonal parameters of a least-squares straight line fit for n pieces of pattern information by using the m orthogonal parameters obtained by said orthogonal transformation means; and a substraction means for subtracting the second orthogonal parameters from the corresponding first orthogonal parameters in order to output the subtracted results as pattern features. The Fourier transform, the COSINE transform, the Walsh-Hadamard transform, or the KL transform can be used for the orthogonal transformation. If data, which has been prepared by logarithmically transforming the spectral data of speech, is used as the n pieces of pattern information, and if the Fourier transform is used as the orthogonal transformation, normalized cepstrum data can be used as the feature parameters. In such parameters, the quantity of information is compressed and influences from personal and transmission characteristics are eliminated.

DESCRIPTION OF THE PREFERRED EMBODIMENTS

Figure 1:
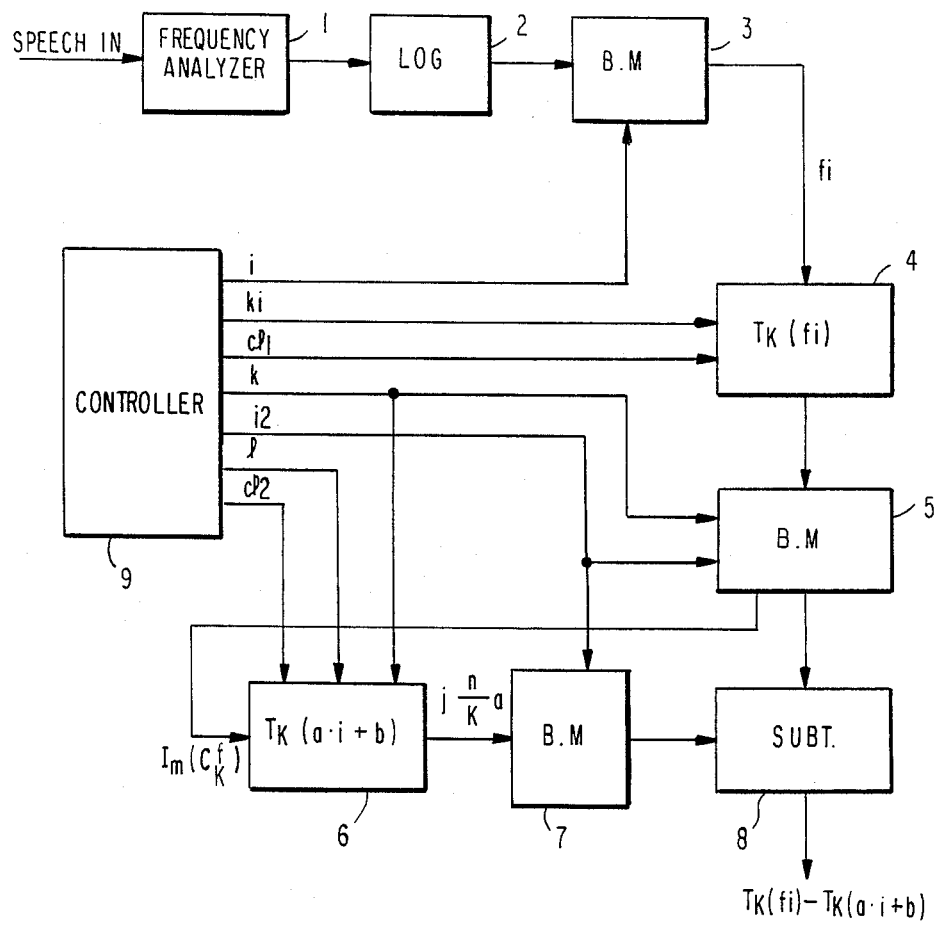
FIG. 1 is a block diagram showing an embodiment in which the present invention is applied to a speech recognition system.

First of all, the fundamental principles of the present invention will be described in the following. Since addition and subtraction operations are not influenced by an orthogonal transformation, the following equations holds if the orthogonal transformation is expressed by T (T < $T_1, T_2, \ldots, T_k, \ldots T_n$):

$$T_k\{f_i - (a \cdot i + b)\} = T_k(f_i) - T_k\{(a \cdot i + b)\} \quad (7)$$

wherein $k = 1, \ldots, n'$.

The orthogonal transformation $T_k$ is an operation for feature extraction. There are n' orthogonal parameters, but are number of orthogonal parameters usually used as feature parameters is a value m which is significantly smaller than the number n of the parameters $f_i$. This is because the quantity of information in the parameters $f_i$ is compressed by the orthogonal transformation. As a result, the normalization using equation (7) requires a smaller number of calculations than that using equation (1). For example, as has been described hereinbefore, in the case of speech recognition using cepstrum parameters as feature parameters, inverse Fourier Transform as the orthogonal transformation $T_k$, and n = 128, n' = 128 and m = 8, the number of calculations required by equation (7) is one sixteenth those required by equation (1). From the Parseval equation, moreover, the following holds:

$$E = \sum_{i=1}^{n} |\{f_i - (a \cdot i + b)\}|^2 = \sum_{k=1}^{n'} |T_k\{f_i - (a \cdot i + b)\}|^2. \quad (8)$$

The linear operations are not influenced by the orthogonal transformation. Therefore, the following equation holds:

$$\begin{aligned}
E &= \sum_{k=1}^{n'} |T_k(f_i) - a \cdot T_k(i) - b \cdot T_k(1)|^2 \\
&= \sum_{i=1}^{n'} [[(Re\{T_k(f_i)\} - a \cdot Re\{T_k(i)\} - b \cdot Re\{T_k(1)\}]^2 + \\
&\quad [Im\{T_k(f_i)\} - a \cdot Im\{T_k(i)\} - b \cdot Im\{T_k(1)\}]^2].
\end{aligned} \quad (9)$$

wherein Re(x) and Im(x) respectively are the real and imaginary parts of x.

From equations (3) and (4), the parameters a and b of the least-squares straight line are determined by solving the following equations:

$$FI - a \cdot I_2 - b \cdot I_1 = 0 \quad (10)$$

and $$FK - a \cdot I_1 - b \cdot K_2 = 0 \quad (11)$$

wherein:

$$FI = \sum_{k=1}^{n'} [Re\{T_k(f_i)\} \cdot Re\{T_k(i)\} + Im\{T_k(f_i)\} \cdot Im\{T_k(i)\}] \quad (12)$$

$$FK = \sum_{k=1}^{n'} [Re\{T_k(f_i)\} \cdot Re\{T_k(1)\} + Im\{T_k(f_i)\} \cdot Im\{T_k(1)\}] \quad (13)$$

$$I_2 = \sum_{k=1}^{n'} [Re^2\{T_k(i)\} + Im^2\{T_k(i)\}] \quad (14)$$

$$I_1 = \sum_{k=1}^{n'} [Re\{T_k(i)\} \cdot Re\{T_k(1)\} + Im\{T_k(i)\} \cdot Im\{T_k(1)\}] \quad (15)$$

$$K_2 = \sum_{k=1}^{n'} [Re^2\{T_k(1)\} + Im^2\{T_k(1)\}]. \quad (16)$$

Here, since the orthogonal transformation $T_k(f_i)$ for a large k is sufficiently small, the equations (17) and (18) can be used in place of equations (12) and (13) if the terms larger than m are omitted.

$$FI \approx \sum_{k=1}^{m} [Re\{T_k(f_i)\} \cdot Re\{T_k(i)\} + Im\{T_k(f_i)\} \cdot Im\{T_k(i)\}] \quad (17)$$

and $$FK \approx \sum_{k=1}^{m} [Re\{T_k(f_i)\} \cdot Re\{T_k(1)\} + Im\{T_k(f_i)\} \cdot Im\{T_k(1)\}]. \quad (18)$$

The followings are apparent from equations (7), (10) and (11): The prior art method in which the normalized parameters are developed by first subtracting the value given by the least-squares straight line from the value given by the input patterns, and subsequently subjecting the difference to orthogonal transformations, is equivalent to a method in which both the input patterns and the least-squares straight line are first orthogonally transformed and then the orthogonal parameters of the least-squares straight line are subtracted from the orthogonal parameters of the input patterns. In the former method, the parameters a and b of the least-squares straight line are given by equations (5) and (6), and can be obtained by computing the terms $$\sum_{i=1}^{n} i \cdot f_i \text{ and } \sum_{i=1}^{n} f_i$$

because the variables are $f_i$ in reality. In the latter method, on the other hand, it is sufficient to use equations (17) and (18) because the variables are $T_k(f_i)$ in reality. Comparing the numbers of calculations involved in the two methods, therefore, the latter method requires m/n times the number of calculations as the former. In addition, the normalizing operation is expressed by the following equation if the number of orthogonal parameters used is m, $$T_k(g_i) = T_k(f_i) - T_k(a \cdot i + b) \quad (7')$$

wherein k=1, 2, ..., m.
From the comparison of the number of normalization calculations involved in the two methods as shown by equations (1) and (7'), it is obvious that the latter method requires m/n times the number of subtractions as the former.

As has been described hereinbefore, according to the present invention, the normalizing operation, i.e., the subtractions of the least-squares straight line, which have been conducted before the orthogonal transformations in the prior art, can be conducted after orthogonal transformations so that the number of calculations can be further reduced.

Next, for the case in which the Fourier transform or the COSINE transform is specifically used as the orthogonal transformation, the following description is directed to specific algorithms for determining the parameters of the least-squares straight line and for conducting the normalizing equation (7) after the orthogonal transformations. First of all, when the inverse Fourier transform is used as the orthogonal transformation, i.e., the orthogonal transformation is conducted by the use of the following equation:

$$T_k(f_i) = \sum_{i=1}^{n} f_i \cdot \left( \cos \frac{2ki\pi}{n} + j\sin \frac{2ki\pi}{n} \right) \quad (19)$$
$$= C_k^f$$
$$= Re(C_k^f) + j\, Im(C_k^f)$$

the previous equations (17), (18), (14), (15) and (16) become:

$$FI = \sum_{k=1}^{m} Im(C_k^f) \cdot \frac{n}{k}$$

$$FK = 0$$

$$I_2 = \sum_{k=1}^{n'} \frac{n^2}{k^2}$$

$$I_1 = 0$$
$$K_2 = 0$$

and can be substituted into equation (10) to obtain the parameter a in the following form:

$$a = \frac{\sum_{k=1}^{m} \frac{1}{k} Im(C_k^f)}{n \sum_{k=1}^{n'} \frac{1}{k^2}}. \quad (20)$$

Therefore, the orthogonal parameters of the least-squares straight line are expressed by the following equation by using equation (19), taking $T_k(b) = bT_k(1) = 0$ into consideration:

$$T_k(a \cdot i + b) = j \frac{n}{k} a. \quad (21)$$

If the normalized feature parameters are expressed by $C_k^g$, the normalizing equation (7) becomes:

$$C_k^g = C_k^f - j \frac{na}{k}. \quad (22)$$

In short, the parameters a and the orthogonal parameters for the least-squares straight line can be developed by equations (20) and (21), and the normalization can be conducted in accordance with equation (22).

On ther other hand, when the COSINE transform is used as the orthogonal transformation, i.e., the orthogonal transformation is conducted by the following equation:

$$T_k(f_i) = \sum_{i=1}^{n} f_i \cdot \cos \frac{ki\pi}{n} \quad (23)$$
$$= C_k^f,$$

the equations (17), (18), (14), (15) and (16) become:

$$FI = \sum_{k=1}^{m} C_k^f \cdot \frac{n}{k^2 n} \cdot (1-1)^k - 1$$

$$FK = 0$$

$$I_2 = \sum_{k=1}^{n'} \frac{n^2}{k^4 \pi^2} (1-1)^k - 1^2$$

$$I_1 = 0$$

-continued $$K_2 = 0$$

and can be substituted into equation (10) to obtain the parameter a in the following form:

$$a = \frac{\sum\limits_{k=1}^{m} C_k \frac{1}{k^2} \{(-1)^k - 1\}}{\sum\limits_{k=1}^{n'} \frac{n}{k^4 \pi} \{(-1)^k - 1\}^2}. \tag{24}$$

Therefore, the orthogonal parameters of the least-squares straight line are expressed by the following equation:

$$T_k(a \cdot i + b) = \frac{an}{k^2 \pi} \{(-1)^k - 1\}, \tag{25}$$

and the normalizing equation (7) becomes:

$$C_k{}^g = C_k{}^f - \frac{an}{k^2 \pi} \{(-1)^k - 1\}. \tag{26}$$

In short, the parameter a and the orthogonal parameters for the least-squares straight line can be computed by equation (24) and (25), and the normalization can be conducted in accordance with equation (26).

The present invention will now be described in connection with its specific applications. FIG. 1 shows an example in which the present invention is applied to a speech recognition system using cepstrum data as the feature parameters.

An input utterance SPEECH IN of electric signals is subjected to frequency analysis in a frequency analyzer 1 such as an n-channel filter bank or an 2n-point FFT circuit to obtain spectral data. This spectral data is logarithmically converted by a log. converter 2 and is then stored in a buffer memory 3. Spectral data $f_i$ is read out from the buffer memory 3 in accordance with a signal i from a controller 9, and is sent to a first orthogonal transformer 4.

An inverse Fourier transform is used as the orthogonal transformation of the first transformer to develop the cepstrum data. In the first orthogonal transformer 4, the input pattern $f_i$ is first subjected to an inverse Fourier transformation, as expressed by equation (19), so that the feature parameters $C_k{}^f$ are developed and stored in buffer memory 5. Then, in a second orthogonal transformer 6, the orthogonal parameters $T_k(a \cdot i + b)$ of the least-squares straight line is developed, as expressed in equations (20) and (21), from the orthogonal parameters $C_k{}^f$ of the input pattern which have been read from the buffer memory. The orthogonal parameters of the least-squares straight line are stored in a buffer memory 7. A subtracter 8, on the basis of signals read out from buffer memories 5 and 7, subtracts the orthogonal parameters of the least-squares straight line from the orthogonal parameters of the input pattern, as expressed by equation (22), so that normalized feature parameters $C_k{}^g$ are determined.

Figure 2A:
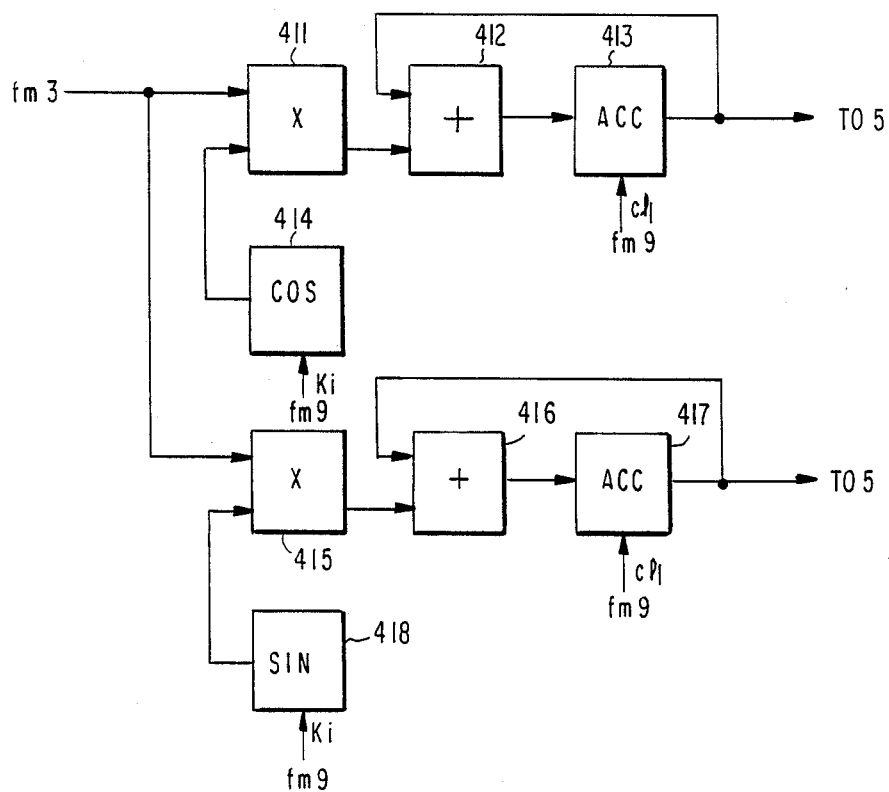
FIGS. 2A and 2B are a detailed block diagram of one example of the first orthogonal transformer employed in FIG. 1, using the Fourier transform, and an operation timing chart thereof.
Figure 2B:
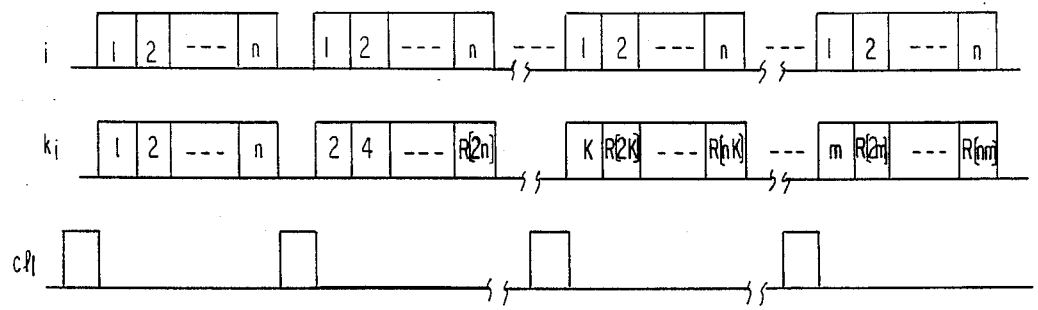

FIG. 2A is a block diagram showing the construction of a specific example of the first orthogonal transformer 4. A cosine table 414 and a sine table 418 are tables containing cosine values and sine values expressed by cos $2k\pi/n$ and sine $2k\pi/n$, respectively, wherein k=1 to n. In response to a signal $k_i$ from the controller 9, cosine or sine values are output to a multiplier 411 or 415, respectively. The spectral data read out from the buffer memory 3 in accordance with the signal i is input to the orthogonal transformer 4. The controller 9 generates signals i, $k_i$ and $cl_1$ according to the timing chart shown in FIG. 2B. The signal i varies from 1 to n, and these variations are repeated m times to obtain a total of m orthogonal parameters ($T_1, T_2, \ldots, T_m$). The signal $cl_1$ is output to accumulators 413 and 417, immediately before the signal i reaches 1, to reset their stored values to zero. The signal $k_i$ is a value R[k·i,n], where R[ ] is the remainder of a division by n, for i=1 to n and k=1 to m. This is because all the values of cos $2ki\pi/n$ and sin $2ki\pi/n$ can be obtained from the n values for a certain period, since sine and cosine are periodic functions. Namely, as the signal $k_i$, signals are generated which have values 1, 2, ..., n; 2, 4, ..., R[2n]; k, R[2k], ..., R[nk]; and m, R[2m], ..., and R[nm]. The signals $f_i$ are read out consecutively in accordance with the signal i, for i=1 to n from the buffer memory 3 and are supplied to the multipliers 411 and 415. In accordance with the signal $k_i$, moreover, the values cos $2ki\pi/n$ and sin $2ki\pi/n$ are read out from the cosine table 414 and the sine table 418, respectively, and are supplied to the multipliers 411 and 415, respectively. These multipliers 411 and 415 respectively obtain $f_i \cdot \cos 2ki\pi/n$ and $f_i \cdot \sin 2ki\pi/n$. The adders 412 and 416 respectively determine $$\sum_{i=1}^{n} f_i \cdot \cos \frac{2ki\pi}{n} \text{ and } \sum_{i=1}^{n} f_i \cdot \sin \frac{2ki\pi}{n}$$

from the outputs of the multipliers 411 and 415. When the value of the signal i becomes equal to n, the real part $R_e(C_k{}^f)$ and imaginary part $I_m(C_k{}^f)$ of the Fourier (or orthogonal) parameters are obtained in the accumulators 413 and 417.

Figure 3A:
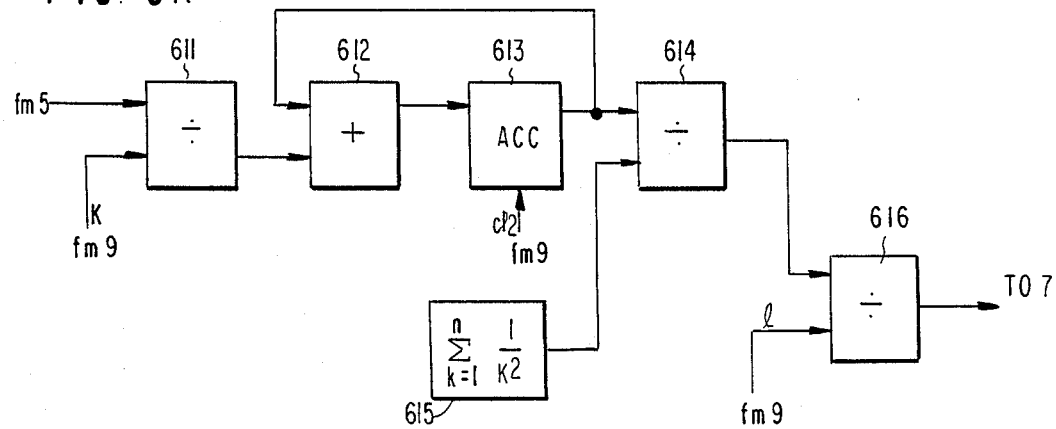
FIGS. 3A and 3B are a detailed block diagram of one example of the second orthogonal transformer employed in FIG. 1, and an operation timing chart thereof.
Figure 3B:
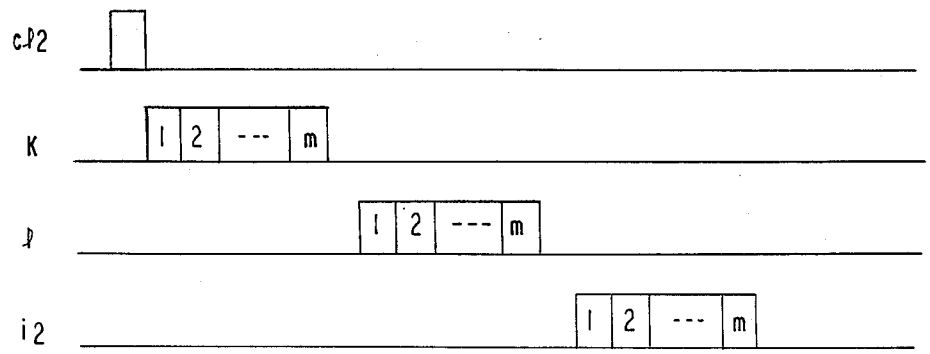

FIG. 3A is a block diagram showing a specific construction of the second orthogonal transformer 6. The imaginary parts $I_m(C_k{}^f)$ of the Fourier parameters for k=1 to m, which are read out from the buffer memory 5 in response to the signal k (1 to m) from the controller 9, are sent to the divider 611. The signals from the controller 9 relating to the second orthogonal transformer 6 are k, l, $i_2$ and $cl_2$, as shown in FIG. 3B. The signal k varies from 1 to m, the signals l and $i_2$ are generated after the end of the supply of the signals k and l, respectively, and also vary from 1 to m. The signal $cl_2$ is used for clearing the content in an accumulator 613. The imaginary parts $I_m(C_k{}^f)$ are read out consecutively in accordance with the signal k for k=1 to m from the buffer memory 5, and the quotient $I_m(C_k{}^f)/k$ is obtained by a divider 611. The summation $$\sum_{k=1}^{m} I_m(C_k{}^f)/k$$

is obtained through an adder 612 and the accumulator 613. The summation is divided in a divider 614 by a constant $$\sum_{k=1}^{n'} \frac{1}{k^2}$$

from a constant memory 615 to determine a value na which is n times as large as the parameter a of the least-squares straight line expressed by equation (20). The signal l is then input as a divisor to a divider 616 so that the value na/l, i.e., the imaginary part of the orthogonal parameter of the least-squares straight line expressed by equation (21) is determined. On the other hand, the real part of the orthogonal parameter of the least-square straight line is zero, as expressed by equation (21). The orthogonal parameters thus determined are stored in the buffer memory 7.

The subtractor 8 is a unit in which the normalization is achieved by subtracting the orthogonal parameters $T_k(a \cdot i + b)$ of the least-squares straight line from the orthogonal parameters $T_k(f_i)$ generated by the first orthogonal transformer 4, as expressed by equation (7) or (7'). The buffer memories 5 and 7 temporarily store m orthogonal parameters $T_k(f_i)$ and $T_k(a \cdot i + b)$ obtained by the first and second orthogonal transformers 4 and 6, respectively. In response to a signal $i_2$ from the controller 9, consequently, the parameters $T_k(f_i)$ and $T_k(a \cdot i + b)$ are read out from the buffer memories 5 and 7, respectively, and are subjected to a subtraction operation so that the normalized parameters $T_k(f_i) - T_k(a \cdot i + b)$ are determined.

In the embodiment thus far described, the sine term of the inverse Fourier transform of equation (19) can be zero, if the spectral data is expressed by an even function. Therefore the inverse Fourier transform is substantially identical to the cosine transform, simplifying the circuit construction. A second embodiment is an example in which the cosine transform is used as the orthogonal transformation. The second embodiment has a basic construction substantially identical to that of FIG. 1 but it differs somewhat in the first and second orthogonal transformers 4 and 6. Specifically, the first orthogonal transformer 4 subjects the input pattern $f_i$ to a cosine transform according to equation (23) to develop the feature parameters $C_k^f$ or the orthogonal parameters. The second orthogonal transformer 6 develop the orthogonal parameters $T_k(a \cdot i + b)$ of the least-squares straight line from the orthogonal parameters $C_k^f$ of the input pattern, as expressed in equations (24) and (25). The subtractor 8 subtracts the orthogonal parameters of the least-squares straight line from the orthogonal parameters of the input pattern, as expressed by equation (26), to determine the normalized feature parameters $C_k^g$.

Figure 4:
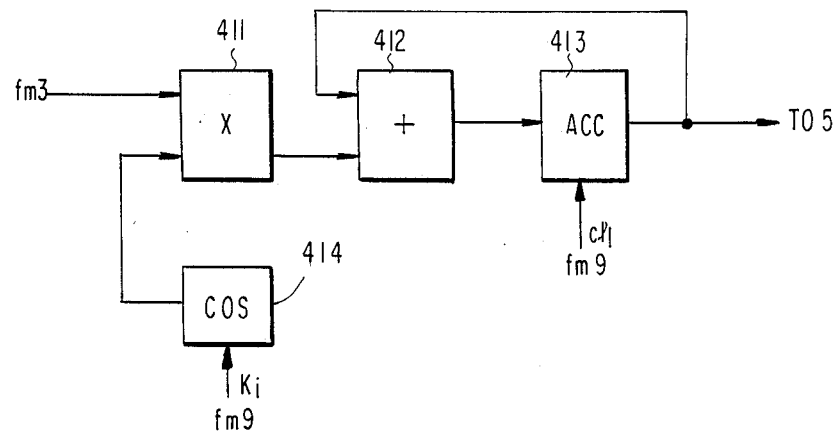
FIG. 4 is a block diagram showing another example of the first orthogonal transformer in FIG. 1, which uses the COSINE transform.

FIG. 4 is a block diagram showing a specific construction of the first orthogonal transformer 4 effecting the cosine transform. In this embodiment, the sine table 418, the multiplier 415 for the sine calculation, the adder 416 and the accumulator 417 are omitted from the first orthogonal transformer 4 for the Fourier transform in the first embodiment. The operations are identical to those of the first embodiment except for the first orthogonal transformer 4 and two points that will be described in the following. The first difference residues in the cosine values which are stored in the cosine table 414. Specifically, the cosine table 414 stores a number 2n of cosine values, i.e., $\cos k\pi/n$ wherein $k = 1$ to $2n$. The second difference resides in the signal $k_i$. Specifically, the signal $k_i$ is a value $R[k \cdot i, 2n]$, wherein $R[\ ]$ is the remainder of a division by 2n, for $i = 1$ to n and $k = 1$ to m.

Figure 5A:
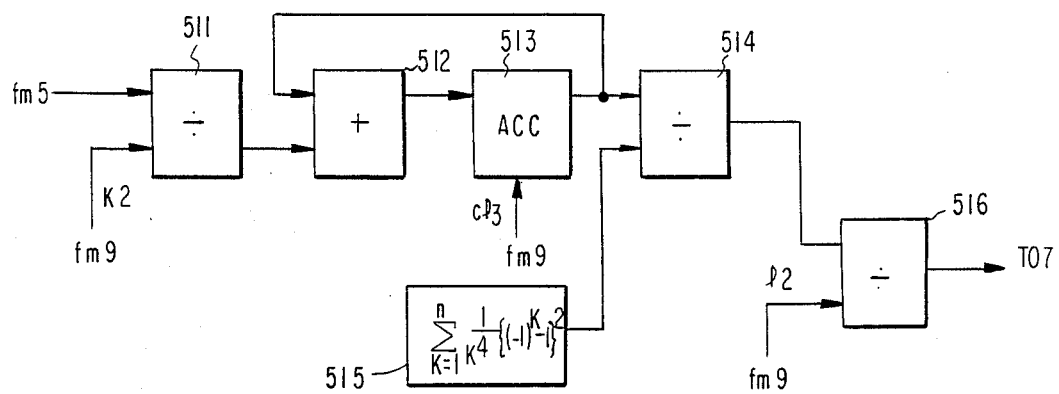
FIGS. 5A and 5B are a detailed block diagram showing another example of the second orthogonal transformer in FIG. 1, and an operation timing chart thereof.
Figure 5B:
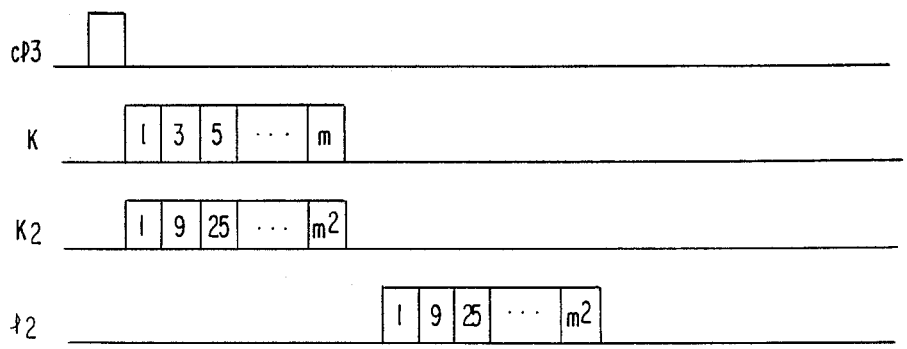

FIG. 5A is a block diagram showing a specific construction of the second orthogonal transformer 6. The odd terms $C_k^f (k = 1, 3, \ldots, m)$ of the orthogonal parameters, i.e., the output of the first orthogonal transformer 4, are temporarily stored in the buffer memory 5. After that, in accordance with the timing chart of FIG. 5B, signals k, $k_2$ and $l_2$ are generated by the controller 9.

Here, the signal k varies over only the odd numbers 1 to m, the signal $k_2$ has the value $k^2$, and the signal $l_2$ has a value $l^2$ which varies over the odd numbers $l = 1$ to m. A signal $cl_3$ is used for clearing the content of an accumulator 513. The odd terms $C_k^f$ are read out consecutively in accordance with the signal k for $k = 1, 3, \ldots, m$ from the buffer memory 5, and the quotient $C_k/k^2$ is obtained by a divider 511. The summation of the outputs of the divider 511

$$\sum_{k'=1}^{2m'-1} C_{2k'-1}/(2k'-1)^2$$

(wherein $k = 2k' - 1$ and $m = 2m'1$) is obtained through an adder 512 and the accumulator 513. A division is conducted in a divider 514 by a constant $$\sum_{k=1}^{n'} \frac{1}{k^2} \{(-1)^k - 1\}^2$$

from a constant memory 515 to develop $-na/2\pi$ which is $-n/2\pi$ times as large as the parameter a of the least-squares straight line expressed by equation (24). Subsequently, in accordance with the signal $l_2$, the value $l^2$ is given as the divisor to a divider 516 so that a value $-an/2l^2\pi$, i.e., the odd term of the least-squares straight line expressed by equation (25), is obtained. On the other hand, the even term of the orthogonal parameter a of the least-squares straight line is zero, as expressed by equation (25). The subsequent normalization is conducted in the subtractor 8 in the same way as in the embodiment of FIG. 1.

Although the present invention has been described hereinbefore in connection with embodiments thereof, it should not have its scope limited by those descriptions. Particularly in the description of the principles of the present invention, it is assumed that the orthogonal parameters $T_k(f_i)$ in equations (10) to (16) for developing the parameters a and b of the least-squares straight line are equal to the orthogonal parameters $T_k(f_i)$ in equation (7) for conducting the normalization. Nevertheless, the least-squares straight line can also be prepared by a method in which they are determined from the average of a plurality of input patterns, i.e., a method in which the pattern $f_i$ used in equations (10) to (16) is replaced in the calculations with an average pattern $\bar{f}_i$ of the multiple input patterns. It is also natural that the aforementioned Walsh-Hadamard or KL transforms can be used as the orthogonal transformation. Furthermore, the present invention should not be limited to speech recognition but can naturally be applied to other pattern recognitions.

What is claimed is:

1. A system for extracting pattern features from pattern data, which is composed of n pieces of pattern information, comprising:
   orthogonal transformation means for orthogonally transforming the pattern data to develop a first set of m (where $m < n$) orthogonal parameters;
   least squares straight line transformation means for determining a second set of m orthogonal parameters of a least-squares straight line fit for said n pieces of pattern information by using the l parameters ($l < m$) of the first set of m orthogonal parameters; and
   a subtraction means for subtracting respective ones of said second set of orthogonal parameters from the corresponding ones of said first set of orthogonal parameters, said subtraction means producing at its output and subtracted results as pattern features.

2. A pattern feature extracting system according to claim 1, wherein said orthogonal transformation means comprises a Fourier transformation means.

3. A pattern feature extracting system according to claim 1, wherein said orthogonal transformation means comprises a cosine transformation means.

4. A pattern feature extracting system according to claim 1, wherein said orthogonal transformation means comprises a Walsh-Hadamard transformation means.

5. A pattern feature extracting system according to claim 1, wherein said orthogonal transformation means comprises a Karhumen-Loeve transformation means.

6. A system for extracting speech pattern features from speech signals comprising:
  frequency analysis means for frequency-analyzing the speech signals;
  logarithmic transformation means for logarithmically transforming the output of said frequency analysis means;
  a first memory for storing the output of said logarithmic transformation means;
  orthogonal transformation means for inverse-Fourier-transforming a signal comprising n pieces of frequency data read out of said first memory to deveop a first set of m orthogonal parameters;
  a second memory for storing the output of said orthogonal transformation means;
  calculation means for calculating an inverse-Fourier-transformation of a least-squares straight line fit for said n pieces of pattern information by using the l parameters (l<m) of the first set of m orthogonal parameters;
  a third memory for storing the output of said calculating means; and
  subtraction means for subtracting respective ones of the second set of orthogonal parameters read out of said third memory from the corresponding ones of the first set of orthogonal parameters read out of said second memory, said subtraction means producing at its output the subtracted results as normalized cepstrum data which are cepstrum of a flattened spectrum.

7. A system according to claim 2, wherein said Fourier transformation means includes:
  cosine and sine memories, each said memories having stored therein in advance cosine and sine values, respectively, and each said memories for respectively outputting corresponding values in response to said pattern information;
  first and second multipliers for respectively multiplying said pattern information with each of the corresponding output signals read out from said cosine and sine memories;
  first and second accumulators for respectively outputting their stored values as the real and imaginary part of each orthogonal parameter;
  a first adder for adding the output of said first multiplier and the output of said first accumulator and writing the added result into said first accumulator; and
  a second adder for adding the output of said second multiplier and the output of said second accumulator and writing the added result into said second accumulator.

8. A system according to claim 1, wherein said least-squares straight line transformation means includes: a first divider for dividing the first set of orthogonal parameters specified by a number k supplied from said orthogonal transformation means; an accumulator; an adder for adding the output of said first divider and the output of said accumulator and writing the added result into said accumulator; a constant memory for outputting a constant; a second divider for dividing the output of said accumulator by the constant from said constant memory; and a third divider for dividing the output of said second divider by said number k and for outputting its divided result as the determined orthogonal parameters.

9. A system according to claim 3, wherein said cosine transformation means includes: a cosine memory for outputting a cosine value selected on the basis of an element of the pattern data; a multiplier for multiplying each element of the pattern data with each of the corresponding cosine values read out from said cosine memory; an accumulator for outputting the stored value as the orthogonal parameter; and an adder for adding the output of said multiplier and the output of said accumulator and writing the added result into said accumulator.

10. A pattern feature extracting system according to claim 1, wherein said orthogonal transformation means is an inverse-Fourier transformation means.

* * * * *